United States Patent
Ritter et al.

(10) Patent No.: US 7,054,136 B2
(45) Date of Patent: May 30, 2006

(54) CONTROLLED ESR LOW INDUCTANCE MULTILAYER CERAMIC CAPACITOR

(75) Inventors: Andrew P. Ritter, Surfside Beach, SC (US); John L. Galvagni, Myrtle Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 0 days.

(21) Appl. No.: 10/446,464

(22) Filed: May 28, 2003

(65) Prior Publication Data

US 2004/0042155 A1 Mar. 4, 2004

Related U.S. Application Data

(60) Provisional application No. 60/386,617, filed on Jun. 6, 2002.

(51) Int. Cl.
*H01G 4/228* (2006.01)
*H01G 4/20* (2006.01)

(52) U.S. Cl. .................................... 361/309; 361/312

(58) Field of Classification Search ............... 361/303, 361/305, 306.1, 306.3, 307, 308.1, 308.2, 361/309, 310
See application file for complete search history.

(56) References Cited

U.S. PATENT DOCUMENTS

| | | |
|---|---|---|
| 4,107,834 A | 8/1978 | Kolkowski |
| 4,164,006 A | 8/1979 | Kolkowski |
| 4,499,524 A | 2/1985 | Shioleno |
| 4,509,100 A | 4/1985 | Puppolo |
| 4,704,657 A | 11/1987 | Yokoe et al. |
| 4,740,863 A | 4/1988 | Langlois |
| 4,853,827 A | 8/1989 | Hernandez |
| 4,910,638 A * | 3/1990 | Berghout et al. ........ 361/321.3 |
| 4,916,576 A | 4/1990 | Herbert et al. |
| 4,949,217 A | 8/1990 | Ngo |

(Continued)

FOREIGN PATENT DOCUMENTS

JP 1991-112134 * 7/1991

(Continued)

OTHER PUBLICATIONS

*Technical Information: The need for Low Inductance Capacitors*, by John Galvagni, Sara Randall, Paul Roughan and Allen Templeton, Jul. 1994, Myrtle Beach, SC; posted on corporate website www.avxcorp.com/TechInfo_catlisting.asp.

(Continued)

*Primary Examiner*—Eric W. Thomas
(74) *Attorney, Agent, or Firm*—Dority & Manning, P.A.

(57) ABSTRACT

A multilayer ceramic capacitor assembly capable of exhibiting low high-frequency inductance and a controlled equivalent series resistance (ESR) while maintaining a useful capacitance value includes respective pluralities of first and second electrode elements interleaved to form a stack. Controlled ESR is achieved either through inclusion of specific types of materials or through alteration of the shape of various component parts. A resistive material may be used in typical end terminations, via terminations, electrode elements or connective tab structures. Additionally, the dielectric may be made lossy so as to enhance resistivity without overly affecting device capacitance. Still further, an additional layer of resistive material may be added to an outer device surface to connect filled-via terminations to end terminations or radial resistive prints may be used to only partially fill the vias. Finally, various electrode element configurations, such as flat plate, serpentine, mesh, L-, O- or U-shaped patterns, may be employed.

45 Claims, 10 Drawing Sheets

U.S. PATENT DOCUMENTS

| | | |
|---|---|---|
| 5,006,964 A | 4/1991 | Ross et al. |
| 5,132,613 A | 7/1992 | Papae et al. |
| 5,142,439 A | 8/1992 | Huggett et al. |
| 5,185,690 A | 2/1993 | Miller |
| 5,313,363 A | 5/1994 | Arbanas |
| 5,414,588 A | 5/1995 | Barbee, Jr. et al. |
| 5,486,277 A | 1/1996 | Barbee, Jr. et al. |
| 5,603,147 A | 2/1997 | Bischoff et al. |
| 5,680,685 A | 10/1997 | Bischoff |
| 5,712,758 A | 1/1998 | Amano et al. |
| 5,729,450 A | 3/1998 | Dimino et al. |
| 5,805,409 A * | 9/1998 | Takahara et al. ............ 361/303 |
| 5,808,856 A | 9/1998 | Bischoff et al. |
| 5,835,339 A * | 11/1998 | Sakamoto et al. ....... 361/321.2 |
| 5,952,040 A | 9/1999 | Yadav et al. |
| 5,973,907 A | 10/1999 | Reed |
| 6,118,647 A * | 9/2000 | Okinaka et al. ............ 361/305 |
| 6,381,117 B1 * | 4/2002 | Nakagawa et al. ...... 361/306.3 |
| 6,542,352 B1 * | 4/2003 | Devoe et al. ............ 361/321.2 |

FOREIGN PATENT DOCUMENTS

JP     5283283     10/1993

OTHER PUBLICATIONS

*ARIES: Using Annular-Ring Embedded Resistors to Set Capacitor ESR in Power Distribution Networks*, by Valerie St. Cyr, Istvan Novak, Nick Biunno and Jim Howard. Manuscript for EPEP2001, Oct. 29-31, 2001, Boston, MA.
English Language Abstract of JP 5-283283; Oct. 29, 1993.

* cited by examiner

CONTROLLED ESR LOW INDUCTANCE MULTILAYER CERAMIC CAPACITOR

PRIORITY CLAIMS

This application claims the benefit of U.S. Provisional Application No. 60/386,617, entitled "CONTROLLED ESR LOW INDUCTANCE MULTILAYER CERAMIC CAPACITOR", filed Jun. 6, 2002 and which is incorporated herein by reference for all purposes.

BACKGROUND OF THE INVENTION

The present subject matter generally relates to a capacitor assembly. More particularly, the present subject matter relates to a multilayer ceramic capacitor assembly for enhanced high frequency performance. Most particularly, the present subject matter relates to a multilayer ceramic capacitor assembly capable of exhibiting lower high-frequency inductance and a controlled equivalent series resistance (ESR).

The development of higher speed microprocessor chips and the miniaturization of both the power conversion circuitry used to power those chips and the circuitry they drive have led to an increase in the demand for small footprint, low inductance capacitors that have a useful ESR value while maintaining an effective capacitance. The need for such capacitors is due to the unintended generation of power supply noise (i.e., voltage fluctuations) across the power supply buses, a result of the simultaneous switching of logic gates during current flow. Such voltage fluctuations may have the undesirable result of causing unintended logic gate switching.

In order to manage this noise problem, decoupling capacitors acting as local energy sources for switching and refreshing logic gates within the circuitry are used. However, as the industry moves toward lower-voltage higher-frequency operating systems, the need exists for a controlled ESR low inductance capacitor that by design maintains its capacitance and minimizes its inductance while increasing its equivalent series resistance. Such a capacitor would have the capability to withstand the power spikes within any voltage fluctuations while serving as a source of energy for refreshing the logic gates connected thereto.

Previously, low inductance wound capacitors have been provided by flattening wound, extended foil sections and welding the extending foil sections to terminal pieces or even edge-welding the foils in spaced positions along the extended foil sections. Other wound capacitors have provided both low inductance and low ESR performance by deforming the extended foil edges, preferably by sawing, to generate metallurgical bonds. Tabs were attached near the foil ends thus providing a round, rolled capacitor without requiring the insertion of multiple tabs during the rolling process. Such a capacitor is disclosed in U.S. Pat. No. 4,509,100 (Puppolo), which is fully incorporated herein by reference.

Another capacitor, a multi-element capacitor, allowing for a lower impedance and lower ESR was provided through the use of a ceramic electrode/metallic electrode combination with a very specific dielectric material used for the ceramic capacitive elements. Such capacitor is disclosed in U.S. Pat. No. 5,973,907 (Reed), which is fully incorporated herein by reference.

While useful for their purpose, neither of the above approaches allows for an increase in the ESR of a capacitor while maintaining low inductance and the effective capacitance of the device. Still further, none of the previous approaches may function effectively during operation of the device at the higher frequencies required by today's electronics. Today's systems use many capacitors in parallel, therefore, combined resistance (impedance) in the circuits is extremely low, especially at the circuits resonant frequency. The circuit has a natural tendency to ring at such frequency and the harmonics of its resonant frequency. This phenomenon creates unwanted electrical noise in the circuit and can lead to an undesirably excessive emission of radio frequency (RF) signals. Small increases in ESR can suppress these undesired phenomena. Furthermore, a controlled circuit impedance typically allows better matching between adjacent functional stages of an electronic device as well as increased power transfer from a power supply to functioning integrated circuit (IC), application specific integrated circuit (ASIC), processor, or other component. Simultaneously, only by maintaining a low inductance and its effective capacitance will the device continue to serve its function in the circuit.

Other known capacitor embodiments claim to provide improved ESR properties. For example, U.S. Pat. No. 4,164,006 (Kolkowski) and U.S. Pat. No. 4,107,834 (Kolkowski) respectively disclose a capacitor with minimized ESR at standard frequencies of operation and a corresponding method for making the same. U.S. Pat. No. 4,499,524 (Shioleno) provides a multilayer ceramic (MLC) capacitor with improved ESR and impedance characteristics. A capacitor with low ESR and low rates of change in ESR is disclosed in U.S. Pat No. 5,006,964 (Ross et al.)

Still further known capacitor technologies are directed to improved inductance characteristics. U.S. Pat. No. 4,853,827 (Hernandez) concerns a multilayer capacitor with alternating conductive and dielectric layers that provides generally high capacitance and low inductance. U.S. Pat. No. 5,313,363 (Arbanas) is discloses a low impedance assembly for use in high frequency applications. A capacitor module designed to provide a minimal amount of stray inductance is the subject of U.S. Pat. No. 5,142,439 (Huggett et al.), and U.S. Pat. No. 4,916,576 (Herbert et al.) concerns a multipin matrix capacitor, aspects of which provide for reduced inductance qualities.

Still further known electronic devices are designed with other particular performance characteristics in mind. U.S. Pat. No. 5,486,277 (Barbee, Jr. et al.) and U.S. Pat. No. 5,414,588 (Barbee, Jr. et al.) disclose high performance capacitors with high energy density, high specific energy, and high voltage breakdown. U.S. Pat. No. 5,729,450 (Dimino et al.) concerns a capacitor that generally offers improved performance over a wider frequency range of operation.

Certain desirable capacitor configurations are achieved with aspects of peripheral terminations comprising a plurality of termination layers. U.S. Pat. No. 4,740,863 (Langlois) and U.S. Pat. No. 5,712,758 (Amano et al.) disclose MLC capacitors with multi-layered end terminations.

Additional background references that concern multi-layered electronic structures or materials for making such devices include U.S. Pat. No. 5,185,690 (Miller), U.S. Pat. No. 5,952,040 (Yadav et al.), U.S. Pat. No. 5,808,856 (Bischoff et al.), U.S. Pat. No. 5,680,685 (Bischoff), U.S. Pat. No. 5,603,147 (Bischoff et al.), U.S. Pat. No. 4,949,217 (Ngo), U.S. Pat. No. 4,704,657 (Yokoe et al.) and U.S. Pat. No. 5,132,613 (Papae et al.)

Based on the needs of present technology and the shortcomings of known capacitor configurations, it is desirable to provide a controlled ESR, low inductance capacitor capable of operating at the higher frequencies required by today's electronic systems. In particular, it is desirable to provide a controlled ESR, low inductance multilayer ceramic capacitor that can operate to filter voltage fluctuations while providing the energy required to refresh the logic gates within the circuitry to which it is attached.

While various aspects and alternative features are known in the field of multilayered capacitors and other specialized electronic devices, no one design has emerged that generally addresses all of the issues as discussed herein. The disclosures of all the foregoing United States patents are hereby fully incorporated into this application for all purposes by reference thereto.

BRIEF SUMMARY OF THE INVENTION

The present subject matter addresses and recognizes various of the foregoing limitations and drawbacks, and others, concerning decoupling capacitors for operation in higher frequency circuitry. More particularly, the present subject matter addresses and recognizes various of the foregoing limitations and drawbacks, and others, concerning multilayer ceramic decoupling capacitors with a controlled ESR and a low inductance. Therefore, the present subject matter provides for a multilayer ceramic capacitor device and method of manufacturing such device.

It is, therefore, a principle object of the subject technology to provide a multilayer ceramic capacitor. In such context it is another object of the present technology to provide a multilayer ceramic capacitor for use in today's higher speed circuitry. Still further, it is another object of the present technology to provide a multilayer ceramic capacitor with a controlled ESR characteristic while maintaining low inductance and useful capacitance values.

It is still another principle object of the present technology to provide a method of manufacturing a multilayer capacitor. It is yet another object of the present technology to provide a method of making a multilayer ceramic capacitor with a controlled ESR value. In such context, it is another object of the present technology to provide a method of manufacturing such a capacitor while maintaining a low inductance and useful capacitance value.

It is yet another principle object of the present subject matter to provide a decoupling capacitor capable of both refreshing logic gates and filtering power spikes common in today's high frequency electronic circuitry. In such context, it is another object of the present subject matter to provide such a decoupling capacitor in the form of a controlled ESR, low inductance multilayer ceramic capacitor. Still further, it is another object of the present subject matter to provide such a multilayer ceramic decoupling capacitor with an ESR value in the tens to hundreds of milliohms.

A capacitor body, in accordance with the presently disclosed technology, comprising a plurality of first conductive layers each forming at least one first electrode element achieves these objects with each of such first electrode elements being electrically connected to a first termination. In addition, a dielectric layer is disposed on each of such plurality of first conductive layers. Further, a plurality of second conductive layers, each forming at least one second electrode element, is disposed on each of the dielectric layers and is electrically connected to a second termination. An additional dielectric layer may then also be disposed on each of the plurality of second conductive layers.

The completed capacitor body comprises a plurality of first electrode elements and a plurality of second electrode elements interleaved to form a stack wherein each of the first electrode elements opposes one of the at least one second electrode elements. The first and second terminations can encompass multiple layers of material, including resistive layers, plated conductive layers, solder barrier layers, etc., with such layers provided in a variety of ordered fashions.

One exemplary manifestation of such layered terminations in accordance with the present subject matter concerns first and second termination layers for each respective first and second terminations. A first inner termination layer is adhered to the capacitor body through any of the known termination methodologies and at least one outer termination layer is plated thereon. In such an embodiment, the inner layer may comprise either a conductive plated layer or a thick film resistor. Exemplary thick film resistor components may be formed of an approximately 50-50 mix of ruthenium dioxide ($RuO_2$) and glass frit or some other suitable material. Similarly, the inner layer may comprise an organic resistive material, or plated-on or sputtered-on materials that have or can be made to have resistive properties, such as nickel, chrome or tantalum that can be converted to resistive material. Conductive termination layers, which may be plated to and encompassing an inner resistive layer, may comprise Ni, Ni/Cr, Ag, Pd, Sn, Pb/Sn or the like. In an alternative embodiment, where such capacitor is of a base metal, $N_2$-firing resistive material may be used as terminations or portions thereof.

Another exemplary multi-layered termination with controlled resistive properties in accordance with the disclosed technology corresponds to three-layered first and second terminations, comprising an inner layer, an outer layer and an intermediate layer. The inner layer may comprise, for example, a thick film resistor that is either fired on or affixed with polymer adhesives. The inner layer may also correspond to a plated resistive material such as previously disclosed. An intermediate layer may comprise a solder barrier layer, for example a Ni-solder barrier layer that is plated on the inner resistive layer. An outer layer may then comprise a conductive layer, such as plated Ni, Ni/Cr, Ag, Pd, Sn, Pb/Sn other suitable plated solder.

A still further exemplary multi-layered termination with controlled resistive properties in accordance with the disclosed technology corresponds to four-layered first and second terminations, comprising a first layer of plated end-terminations on top of which second, third and fourth wrap-around layers are provided. More particularly, the first end layer corresponds to conductive material or metal "flash" that is plated or fired-on to the end surfaces of the capacitor device, generally where the internal electrode elements are exposed along the device periphery. A second layer, covering the first conductive layer and preferably wrapping around to selected adjacent surfaces of the device, comprises a thick-film resistor or layer of plated resistive material that adds a controlled impedance to the capacitor device. Third layer, also preferably a wrap-around layer, may comprise a solder barrier layer, for example a Ni-solder barrier layer that is plated on the second resistive layer. A fourth outer layer may then comprise a conductive layer, such as plated Ni, Ni/Cr, Ag, Pd, Sn, Pb/Sn other suitable plated solder.

It should be appreciated that each of the exemplary multi-layered resistive terminations presented above may be altered or combined to form a variety of additional alternative embodiments of the present technology. For example, different types and amounts of materials as disclosed may be provided in different orders to form varied multi-layered terminations, all of which fall within the spirit and scope of the present technology.

In an alternative exemplary embodiment, there is provided a capacitor body comprising a plurality of first conductive layers, each forming at least one first electrode element. Each of such first electrode elements is electrically connected to a first termination. In addition, a dielectric layer is disposed on each of such plurality of first conductive layers. Further, a plurality of second conductive layers, each forming at least one second electrode element, is disposed on each of the dielectric layers and is electrically connected to a second termination. An additional dielectric layer may then also be disposed on each of the plurality of second conductive layers.

The completed capacitor body comprises a plurality of first electrode elements and a plurality of second electrode elements interleaved to form a stack wherein each of the first electrode elements opposes one of the at least one second electrode elements. Each of such pluralities of first and second electrode elements is formed in a shape other than a flat plate so as to increase the length of the path of the electricity flow. Several alternative shapes may be used including a spiral, a mesh or a serpentine pattern that enhances the capacitor's equivalent series resistance (ESR) by providing a longer current path throughout the device.

In another alternative exemplary embodiment, there is provided a capacitor body comprising a plurality of first conductive layers, each forming at least one first electrode element. Each of such first electrode elements is electrically connected to a first termination. In addition, a dielectric layer is disposed on each of such plurality of first conductive layers. Further, a plurality of second conductive layers, each forming at least one second electrode element, is disposed on each of the dielectric layers and is electrically connected to a second termination. An additional dielectric layer may then also be disposed on each of the plurality of second conductive layers.

The completed capacitor body comprises a plurality of first electrode elements and a plurality of second electrode elements interleaved to form a stack wherein each of the first electrode elements opposes one of the at least one second electrode elements. At least one of the first and second terminations may comprise a via through the capacitor body wherein such via is electrically connected to either the plurality of first electrode elements or the plurality of second electrode elements but not both. Such via may be filled with $RuO_2$ or other suitable thick film or polymer resistive material. The electrode elements not in direct electrical contact with such via may be of any appropriate shape including a flat plate with a hole therein or any other shape allowing for the unimpeded passage of the via through the device body.

In yet another alternative exemplary embodiment, there is provided a capacitor body comprising a plurality of first conductive layers, each forming at least one first electrode element. Each of such first electrode elements is electrically connected to a first termination. In addition, a dielectric layer is disposed on each of such plurality of first conductive layers. Further, a plurality of second conductive layers, each forming at least one second electrode element, is disposed on each of the dielectric layers and is electrically connected to a second termination. An additional dielectric layer may then also be disposed on each of the plurality of second conductive layers.

The completed capacitor body comprises a plurality of first electrode elements and a plurality of second electrode elements interleaved to form a stack wherein each of the first electrode elements opposes one of the at least one second electrode elements. Some or all of such electrode elements may be composed of a resistive material. In one manifestation, a low temperature co-fired ceramic may be used to form the electrode elements. One such material is $RuO_2$. In another manifestation, a higher temperature analog to the use of $RuO_2$ could be used to form such electrode elements. Such materials could include Ni/Cr, Ni/P or Pd/Ag alloys, as well as, various nitrides and/or other suitable materials.

In still another alternative exemplary embodiment, a capacitor body comprising a plurality of first electrode elements and a plurality of second electrode elements interleaved to form a stack wherein each of the first electrode elements opposes at least one of the plurality of second electrode elements is provided. In this alternative embodiment, the dielectric material may be altered to be lossy (i.e., capable of causing attenuation or dissipation of electrical energy) so as to provide a controlled resistive capability during the manufacture of such a multilayer capacitor.

In another alternative exemplary embodiment, there is provided a capacitor body comprising a plurality of first conductive layers and a plurality of second conductive layers, each forming a plurality of first electrode elements and a plurality of second electrode elements, respectively. Such first and second electrode elements are interleaved so as to oppose each other and form a stack. Each of such electrode elements is electrically connected to a termination. The first electrode elements are connected to a termination of a first polarity and the second electrode elements are connected to a termination of a second polarity. The second polarity opposes that of the first polarity.

In such embodiment, each of the electrode elements may be electrically connected to its respective termination by way of an extended electrode tab portion. Generally, such tabs are comprised of an electrically conductive material such as nickel. In the present alternative embodiment, an additional material capable of altering the conductivity of the material comprising the tab may be diffused into the tab structure material. Such additional material may also thus diffuse into portions of the electrode elements themselves. One such additional material that could be added to the tab structure material is chrome. Such a material addition to the tab structure (and also to the electrode elements in some embodiments) would provide for control of the ESR of the device during its construction.

In an alternative to the above exemplary embodiment, the tab structures that connect the internal electrode elements to their respective terminations could instead be formed with a resistive material as opposed to traditional conductive materials similar to the electrode elements themselves. By printing the electrode tabs with resistive material, another embodiment of the present technology with controlled ESR is provided. In still another alternative to the above exemplary embodiment, the tab structures could be narrowed providing less surface area over which the electricity could flow thus increasing its ESR to a predetermined value.

Finally, in another alternative exemplary embodiment, there is provided a capacitor body comprising a plurality of first conductive layers, each forming at least one first electrode element. Each of such first electrode elements is electrically connected to at least one first termination. In addition, a dielectric layer is disposed on each of such plurality of first conductive layers. Further, a plurality of second conductive layers, each forming at least one second electrode element, is disposed on each of the dielectric layers and is electrically connected to at least one second termination. An additional dielectric layer may then also be disposed on each of the plurality of second conductive layers.

The completed capacitor body comprises a plurality of first electrode elements and a plurality of second electrode elements interleaved to form a stack wherein each of the first electrode elements opposes one of the at least one second electrode elements. At least one of such plurality of first and second terminations may comprise either resistive or conductive material filling a via through the capacitor body wherein such via is electrically connected to either the plurality of first electrode elements or the plurality of second electrode elements but not both. A resistive surface on the outside of the capacitor body may be used to connect the at least one via to at least one similarly polarized termination elsewhere on the capacitor body. Alternatively, a radial resistive print may be used to connect the at least one via and its resistive material cap to at least one termination elsewhere on the capacitor body.

Yet another alternative embodiment of the disclosed technology provides for a capacitor device with first and second internal conductive layers, each respectively comprising at least one electrode element. The first and second internal conductive layers are interleaved with dielectric layers in a stack such that selected first and second electrode elements oppose each other. A conductive pad or other termination connection is preferably provided on a selected top or bottom layer of the device. A controlled thick-film resistor or plated resistive layer is then preferably provided along the ends of the device where internal electrode elements are exposed. The resistive elements wrap around to the surfaces where the conductive pads are provided such that an electrical connection is formed between the internal electrode elements and the external conductive termination portions.

Additional objects and advantages of the disclosed technology are set forth in, or will be apparent to those of ordinary skill in the art from, the detailed description as follows. Also, it should be further appreciated that modifications and variations to the specifically illustrated and discussed features and materials hereof may be practiced in various embodiments and uses of this technology without departing from the spirit and scope thereof, by virtue of present reference thereto. Such variations may include, but are not limited to, substitutions of the equivalent means, features, and materials for those shown or discussed, and the functional or positional reversal of various parts, elements, features, or the like.

Still further, it is to be understood that different embodiments, as well as different presently preferred embodiments, of this technology, may include various combinations or configurations of presently disclosed method steps, features, elements, or their equivalents (including combinations of method steps, features or configurations thereof not expressly shown in the FIGS. or stated in the detailed description).

These and other method steps, features, aspects and advantages of the present subject matter will become better understood with reference to the remaining specification. The accompanying drawings, which are incorporated in and constitute a part of this specification, illustrate at least one embodiment of the present subject matter and, together with the description, serve to explain the principles of the disclosed technology.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
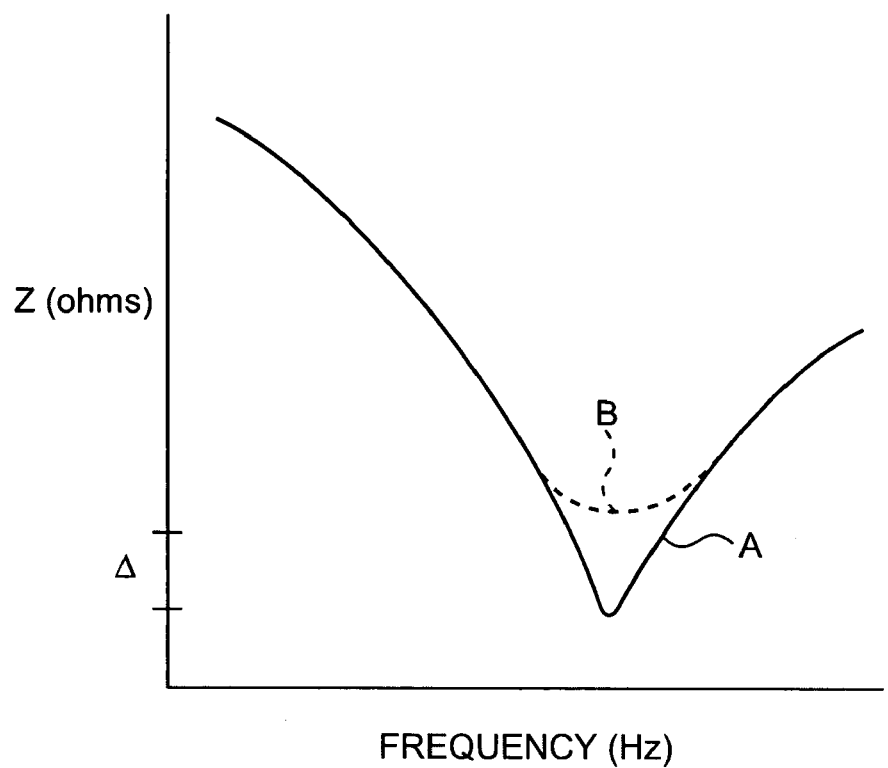
FIG. 1 is an exemplary Impedance vs. Frequency curve for a typical multilayer capacitor as compared to an exemplary Impedance vs. Frequency curve for a capacitor in accordance with the present subject matter.

Repeat use of reference characters throughout the present specification and appended drawings is intended to represent the same or analogous features or elements of the subject matter.

DETAILED DESCRIPTION OF THE PREFERRED EMBODIMENTS

Reference will now be made in detail to presently preferred embodiments of the present technology, examples of which are fully represented in the accompanying drawings.

Such examples are provided by way of an explanation of the technology, not limitation thereof. In fact, it will be apparent to those skilled in the art that various modifications and variations can be made in the present subject matter, without departing from the spirit and scope thereof. For instance, features illustrated or described as part of one embodiment can be used on another embodiment to yield a still further embodiment. Still further variations in selection of materials and/or characteristics may be practiced, to satisfy particular desired user criteria. Thus, it is intended that the present subject matter covers such modifications and variations as come within the scope of the present features and their equivalents.

As disclosed above, the present subject matter is particularly concerned with multilayer ceramic capacitor assemblies capable of exhibiting low inductance and a controlled equivalent series resistance (ESR) while maintaining a useful capacitance value at high operating frequencies. As seen in FIG. 1, an Impedance vs. Frequency graph, the impedance, Z, of a typical capacitor (illustrated by curve A) decreases as it approaches its resonant frequency, a point at which the impedance is equal to the ESR of the capacitor. The performance of certain embodiments of the disclosed technology (illustrated by curve B) while generally following the performance curve of the typical capacitor differs in that its impedance at resonance (and thus its ESR) remains measurably higher than conventional multilayer capacitor performance. This increased ESR aids the device in minimizing its RF signal emissions and in matching the impedance of adjacent functional stages in an electronic device. This improvement in performance may be achieved through any of the numerous preferred alternative embodiments described herein.

In a first preferred embodiment of the present technology, as depicted in FIGS. 2A, 2B, 2C and 2D, multilayer ceramic capacitors are provided with multi-layered terminations. At least one layer in such multi-layered terminations comprises a resistive material such that additional controlled ESR is provided to the respective capacitor devices. FIGS. 2A, 2B, 2C and 2D depict multilayer ceramic capacitors 20a, 20b and 20c, respectively. In accordance with the present subject matter each exemplary ceramic capacitor comprises a plurality of first conductive layers each forming at least one first electrode element 22. A plurality of second electrode elements 24 oppose selected of the first electrode elements 22. Internal electrode elements 22 and 24 are arranged in a stack within a body of dielectric material 26. Such stacked arrangement can be alternatively set forth as an arrangement of first and second conductive layers interleaved with a plurality of dielectric layers 26 and pressed to form the device body of ceramic capacitors 20a, 20b, 20c and 20p. In accordance with the capacitor embodiments disclosed in FIGS. 2A, 2B, 2C and 2D, first and second terminations comprise multiple layers, at least one of which corresponds to a resistive material.

Figure 2A:
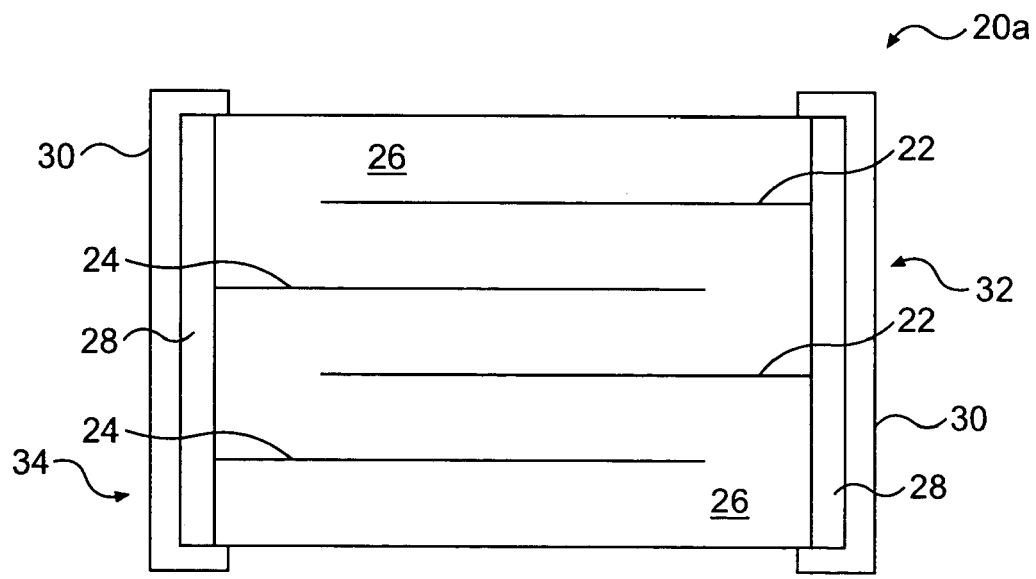
FIG. 2A is a cross-sectional view of a first exemplary embodiment of a multilayer capacitor with multi-layered terminations in accordance with the present subject matter.

In accordance with the exemplary embodiment illustrated in FIG. 2A, multi-layered terminations 32 and 34 each comprise an inner layer 28 adhered to the capacitor body 20a through any of the known termination methodologies and an outer layer 30 plated thereon. In such an embodiment such inner layer 28 may be an approximately 50-50 mix of ruthenium dioxide ($RuO_2$) and glass frit or other suitable material. Alternatively, the inner layer 28 may comprise an organic resistive material. Such an inner layer 28 would provide a strong adhesive bond to the dielectric 26, as well as outstanding thermal expansion characteristics. With such material, thermal shock problems (i.e., situations wherein continued heating and cooling lead to separation of the terminations 32 and 34 from the ceramic body 20) inherent in all capacitors may be reduced. The outer layer 30, plated to and fully enclosing the inner layer 28 may comprise Ni, Ni/Cr, Ag, Pd, Sn, Sn/Pd or the like. Alternatively, where such capacitor is comprised of a base metal, $N_2$-firing resistive material may be used in terminations 32 and 34.

Figure 2B:
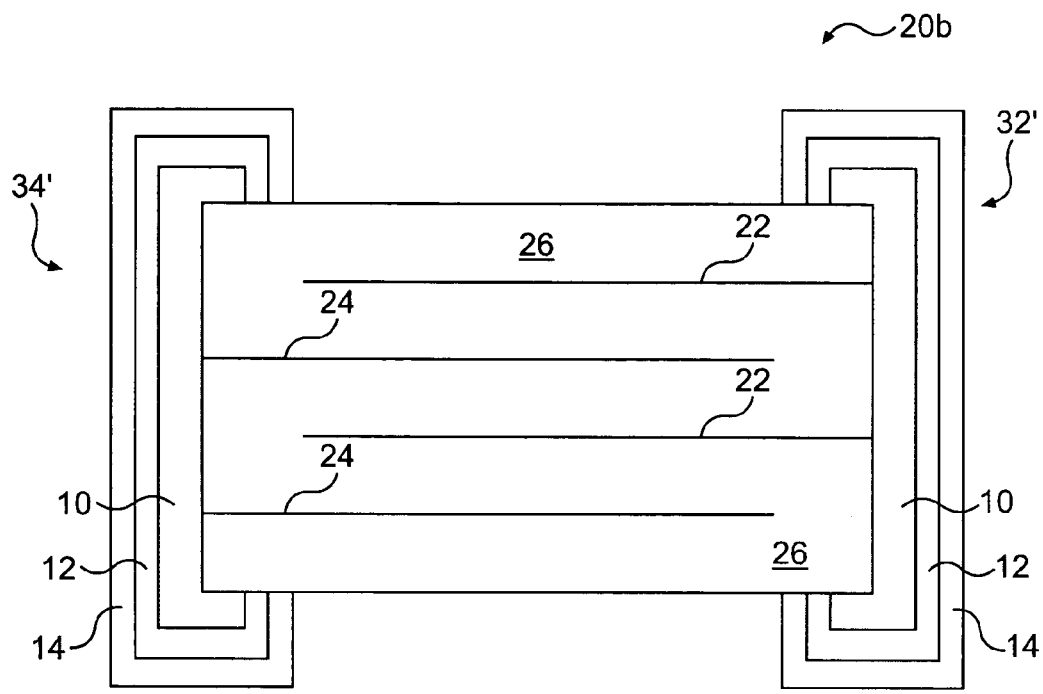
FIG. 2B is a cross-sectional view of an exemplary multilayer capacitor such as illustrated in FIG. 2A with alternative multi-layered terminations in accordance with the present subject matter.

FIG. 2B illustrates an exemplary multilayered capacitor 20b in accordance with the present subject matter having a device body similar to FIG. 2A with first electrode elements 22 and second electrode elements 24 interleaved with dielectric layers 26 to form a stacked configuration. First and second terminations 32' and 34' respectively correspond to a three-layered configuration comprising an inner layer 10, an outer layer 14 and an intermediate layer 12. The inner layer 10 may comprise, for example, a thick film resistor that is either fired on or affixed with polymer adhesives. The inner layer 10 may alternatively correspond to a plated resistive material such as previously disclosed. Intermediate layer 12 may comprise a solder barrier layer, for example a Ni-solder barrier layer that is plated on the inner resistive layer 10. An outer layer 14 may then comprise a conductive layer, such as plated Ni, Ni/Cr, Ag, Pd, Sn, Pb/Sn other suitable plated solder.

Figure 2C:
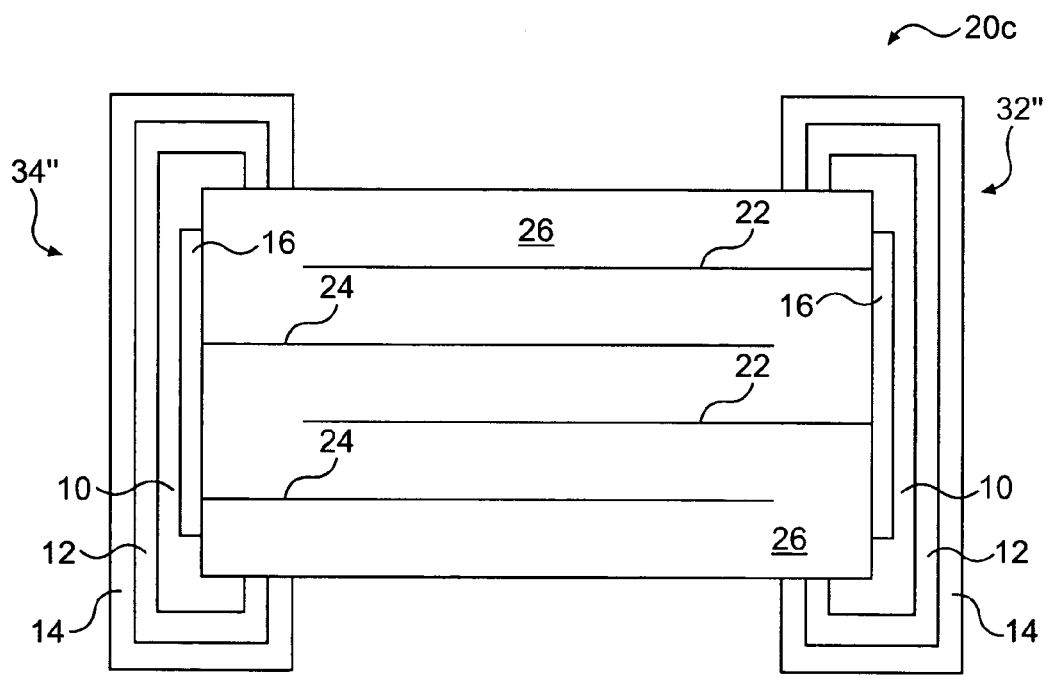
FIG. 2C is a cross-sectional view of an exemplary multilayer capacitor such as illustrated in FIGS. 2A and 2B with further alternative multi-layered terminations in accordance with the present subject matter.

FIG. 2C illustrates an exemplary multilayered capacitor 20c in accordance with the present subject matter having a device body similar to FIGS. 2A and 2B with first electrode elements 22 and second electrode elements 24 interleaved with dielectric layers 26 to form a stacked configuration. First and second terminations 32" and 34" respectively correspond to a four-layered configuration, comprising a first layer 16 of plated end-terminations on top of which second, third and fourth wrap-around layers are provided. More particularly, the first end layers 16 correspond to conductive material or metal "flash" that is plated or fired-on to the end surfaces of the capacitor device, generally where the internal electrode elements 22 and 24 are exposed along the device periphery. A second layer 10, covering the first conductive layer 16 and preferably wrapping around to selected adjacent surfaces of the device, comprises a thick-film resistor or layer of plated resistive material that adds a controlled impedance to the capacitor device. Third layer 12, also preferably a wrap-around layer, may comprise a solder barrier layer, for example a Ni-solder barrier layer that is plated on the second resistive layer. A fourth outer layer 14 may then comprise a conductive layer, such as plated Ni, Ni/Cr, Ag, Pd, Sn, Pb/Sn other suitable plated solder.

With further respect to the exemplary capacitive embodiment 20c of FIG. 2C, it should be appreciated that the inner plated layer 16 need not be a continuous layer of plated material as depicted in the figure. The stacked device body (without terminations) could be subjected to an appropriate plating bath only long enough for conductive material to be plated to the periphery of the device where the internal electrodes are exposed. This would effectively cause individual portions of plated material 16 to be formed along the device periphery. Longer exposure to a plating bath would tend to cause such individual portions to extend together forming a layer 16 of plated material as seen in FIG. 2C. This process of building up conductive material at exposed internal electrode locations facilitates attachment to the electrodes. Alternative processes as should be readily understood in the art other than exposure to a plating bath may also be utilized to form conductive plated portions 16 in accordance with the present subject matter. It should be further appreciated that such aspect can be utilized with other terminations as disclosed in accordance with the present technology.

Figure 2D:
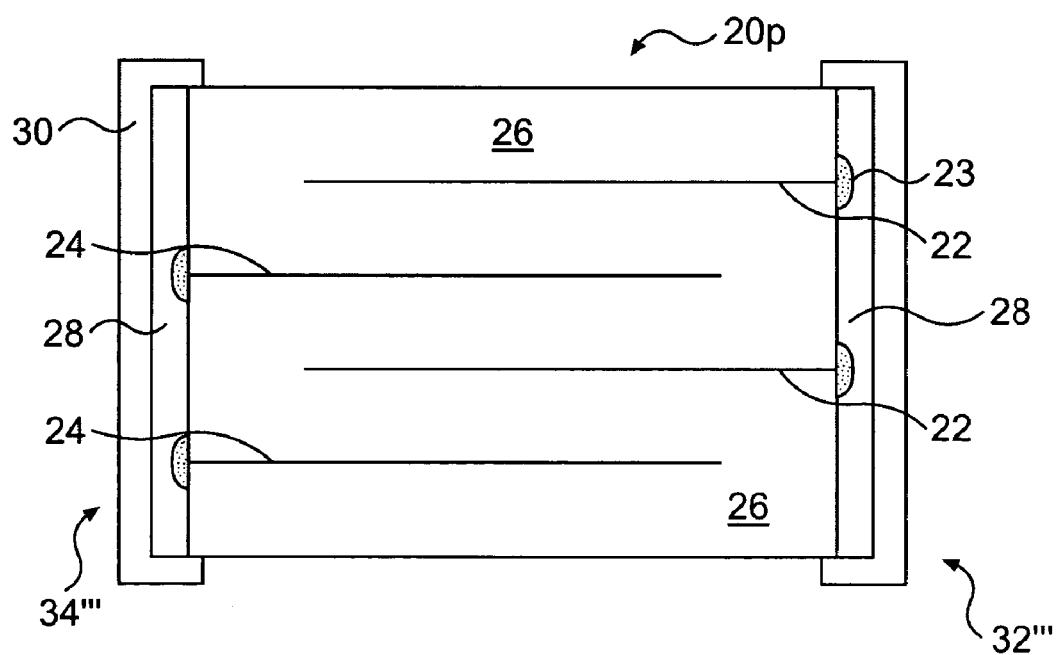
FIG. 2D is a cross-sectional view of an exemplary multilayer capacitor such as illustrated in FIGS. 2A, 2B and 2C with still further alternative multi-layered terminations in accordance with the present subject matter.

A particular example of conductive portions as discussed with regards to the layer of plated material 16 of FIG. 2C is depicted in FIG. 2D. The exemplary capacitive embodiment 20p of FIG. 2D illustrates a device body similar to FIGS. 2A–2C, respectively, with first electrode elements 22 and second electrode elements 24 interleaved with dielectric layers 26 to form a stacked configuration. First and second terminations 32''' and 34''' respectively correspond to a two-layered configuration with inner layer 28 and outer layer 30 as described with respect to FIG. 2A. Before applying termination layers 28 and 30, conductive portions 23 may be formed on the device body of FIG. 2D. These conductive portions are representative of portions of plated material formed at exposed electrode locations along the device periphery. An additionally sufficient buildup of conductive portions 23 may be such that the portions 23 extend into one another forming a continuous layer such as layer 16 of FIG. 2C.

Figure 3A:
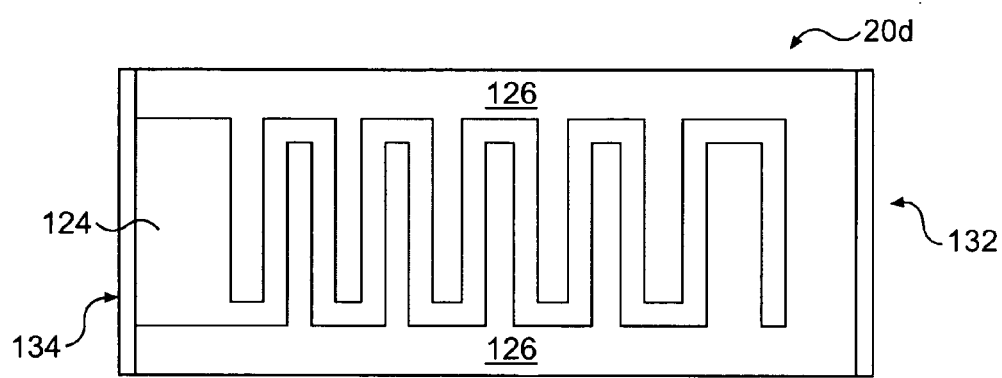
FIG. 3A is an overhead perspective view of an exemplary capacitive element in accordance with a preferred embodiment of the present subject matter.
Figure 3B:
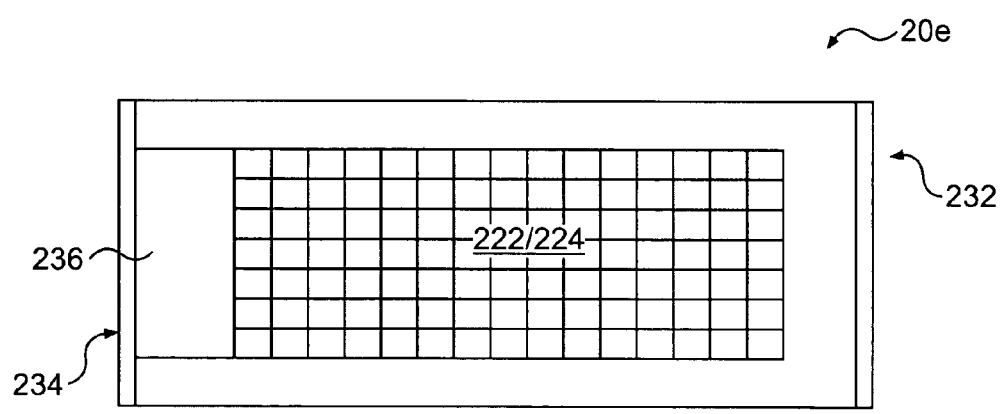
FIG. 3B is an overhead perspective view of an exemplary capacitive element in accordance with an alternatively preferred embodiment of the present subject matter.

FIGS. 3A and 3B show alternative electrode element 124 and 224 designs that may be used in any of the preferred embodiments of the present technology to further enhance the ESR of the ceramic capacitors 20d and 20e while maintaining a reasonably lower inductance and a useful capacitive value. FIG. 3A depicts a serpentine design that by virtue of the increased length of the path raises the resistance of the electrode element. The inductance increase generated within each "leg" of the serpentine layout cancels with a substantially equal and opposing inductance generated in the adjacent "leg". The result is an increase in the effective ESR although sacrificing some aspects of low inductance. Each electrode element 124 in a capacitor embodiment may be connected to peripheral termination 134. Opposing electrodes configured similar to the design of FIG. 3A may also be utilized and may be connected to peripheral termination 132. Such opposing electrode elements when employed in a multilayer capacitor of the present subject matter are preferably separated by dielectric layers 126.

FIG. 3B depicts a mesh-design electrode element 224 that functions similarly to the serpentine pattern 124 described above by virtue of the numerous crossed "legs" throughout the mesh pattern 224. Such a pattern also provides for a longer current path through a multilayered device, thus yielding increased effective ESR.

Figure 4:
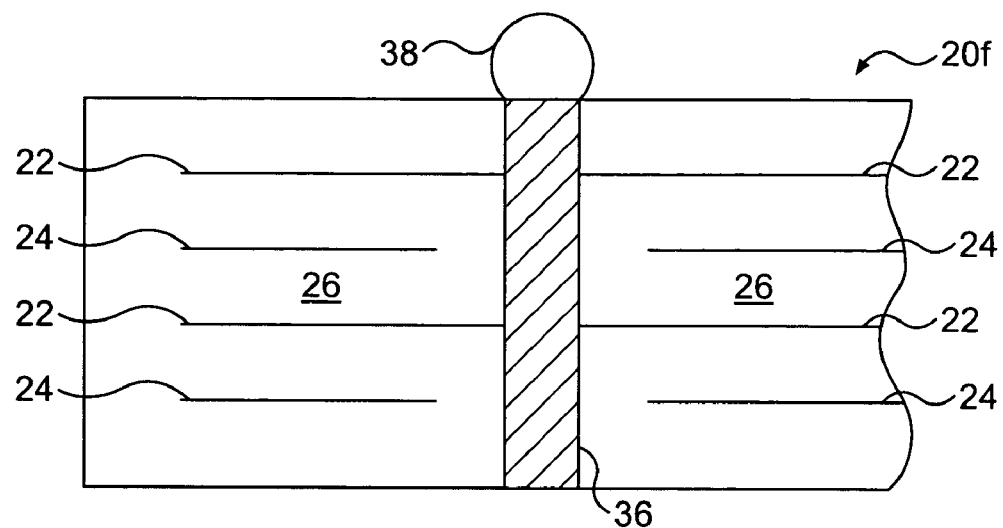
FIG. 4 is a partial cross-sectional view of a second alternative exemplary multilayer capacitor in accordance with the present subject matter.

In a second preferred alternative embodiment, as seen in FIG. 4, a multilayer ceramic capacitor body 20f, in accordance with the present technology, comprising a plurality of first conductive layers each forming at least one first electrode element 22 is provided with each of such first electrode elements 22 being electrically connected to a first termination 36. Such termination 36 is a via, an opening through the capacitor body 20f, which may be either completely filled or coated along the interior thereof with a resistive material.

A dielectric layer 26 is further disposed on each of such plurality of first electrode elements 22. Additionally, a plurality of second conductive layers, each forming at least one second electrode element 24, is disposed on each of the dielectric layers 26 and is electrically connected to an opposing polarity termination.

The completed ceramic capacitor body 20f, therefore, comprises a plurality of first electrode elements 22 and a plurality of second electrode elements 24 interleaved to form a stack wherein each of the first electrode elements 22 opposes one of the at least one second electrode elements 24 and they are separated by intervening layers of dielectric material 26. Each of the first electrode elements may be either a generally flat plate or one of the alternative element configurations described above with respect to FIGS. 3A and 3B. The second electrode elements, being required to avoid electrical connection with such termination via 36, may be either L-, O- or U-shaped as is known in the art. A solder ball 38 may be attached to the via termination 36 for facilitated electrical connection of the device to printed circuit boards or external circuitry.

Figure 5:
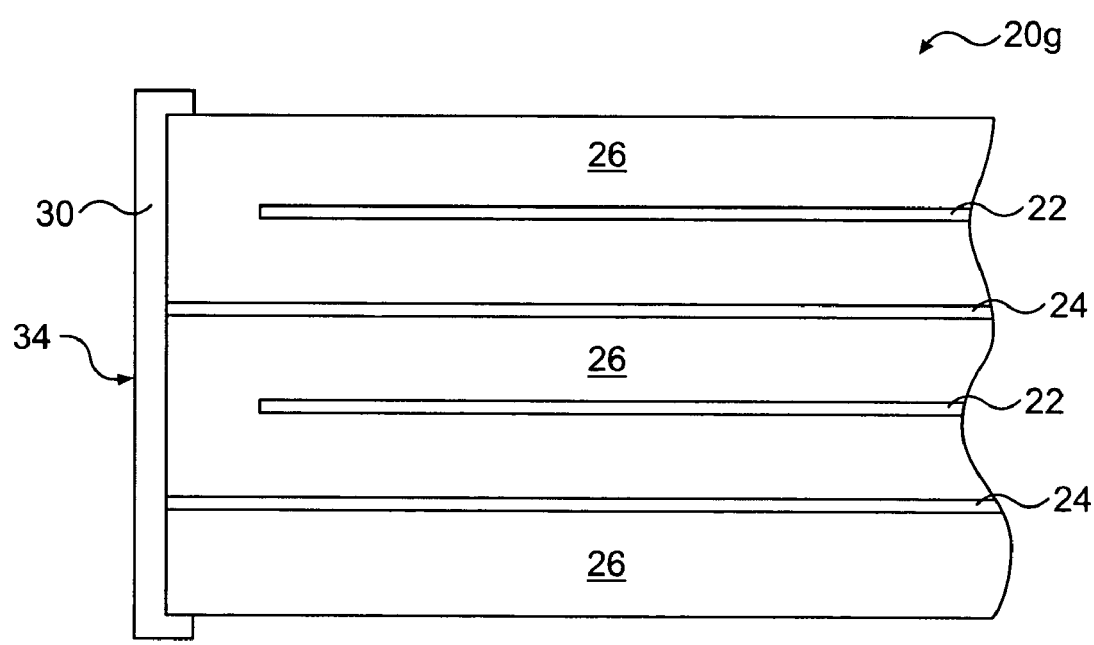
FIG. 5 is a partial cross-sectional view of a third alternative exemplary multilayer capacitor in accordance with the present subject matter.

In a third alternative exemplary embodiment, as seen in FIG. 5, there is provided a capacitor body 20g comprising a plurality of first conductive layers, each forming at least one first electrode element 22. Each of such first electrode elements 22 being electrical connected to a first termination. In addition, a dielectric layer 26 is disposed on each of such plurality of first conductive layers. Further, a plurality of second conductive layers, each forming at least one second electrode element 24, is disposed on each of the dielectric layers 26 and is electrically connected to a second termination 34.

The completed capacitor device 20g comprises a plurality of first electrode elements 22 and a plurality of second electrode elements 24 interleaved to form a stack wherein each of the first electrode elements 22 opposes one of the at least one second electrode elements 24. Some or all of such electrode elements 22 and 24 may be composed of a resistive material. In one manifestation, a low temperature co-fired ceramic may be used to form the electrode elements 22 and 24. One such material is $RuO_2$. In another manifestation, a higher temperature analog to the use of $RuO_2$ could be used to form such electrode elements 22 and 24. Such materials may include Ni/Cr, Ni/P or Pd/Ag alloys, as well as, various nitrides and/or other suitable materials. Through the use of such diverse materials, the manufacturer may select a suitable material based on the manufacturing process as well as the desired ESR of the finished device.

Figure 6A:
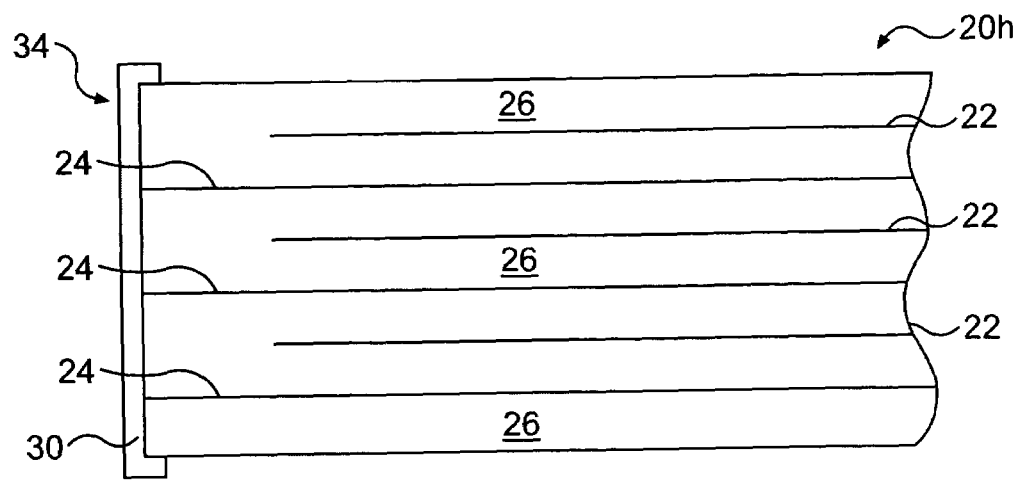
FIG. 6A is a partial cross-sectional view of a fourth alternative exemplary multilayer capacitor in accordance with the present subject matter.

FIG. 6A shows yet another alternative preferred embodiment of the present subject matter. As before, a ceramic multilayer capacitor body 20h is provided. Such ceramic capacitor body 20h comprises a plurality of first conductive layers, each forming at least one first electrode element 22. Each of such first electrode elements 22 being electrical connected to a first termination. A dielectric layer 26 is disposed on each of such plurality of first conductive layers. Further, a plurality of second conductive layers, each forming at least one second electrode element 24, is disposed on each of the dielectric layers 26 and is electrically connected to a second termination 34.

The completed capacitor body comprises a plurality of first electrode elements 22 and a plurality of second electrode elements 24 interleaved to form a stack wherein each of the first electrode elements 22 opposes one of the at least one second electrode elements 24. In the present preferred exemplary embodiment, the dielectric material may be made lossy by any technique known to those of ordinary skill in the art. Making the dielectric lossy lowers its resistance to electron flow within the dielectric, thus raising the dissipation factor (DF) of the device, which has the corresponding effect of raising the device impedance.

Figure 6B:
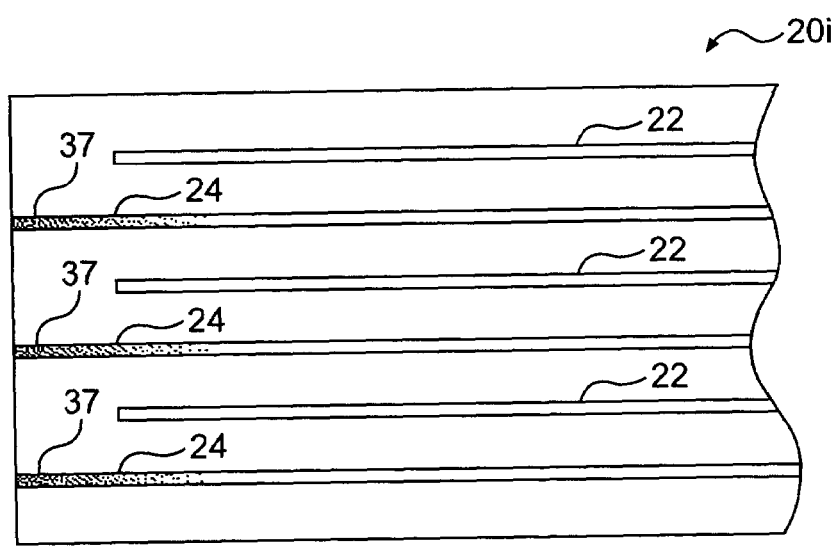
FIG. 6B is a partial cross-sectional view of a fifth alternative exemplary multilayer capacitor in accordance with the present subject matter.

In a fifth alternative exemplary embodiment of the present subject matter, as seen in FIG. 6B, a capacitor body 20i comprising a plurality of first conductive layers, each forming at least one first electrode element 22 is provided. Each of such first electrode elements 22 is electrically connected to a first termination. In addition, a dielectric layer 26 is disposed on each of such plurality of first conductive layers. Further, a plurality of second conductive layers, each forming at least one second electrode element 24, is disposed on each of the dielectric layers 26 and is electrically connected to a second termination 34.

The completed capacitor body comprises a plurality of first electrode elements 22 and a plurality of second electrode elements 24 interleaved to form a stack wherein each of the first electrode elements 22 opposes one of the at least one second electrode elements 24. First or second electrode elements 22 and 24 may either completely extend to the periphery of device 20i or be provided with tab portions that extend from a larger electrode element completely within the boundary of the capacitor body to the periphery of device 20i. Internal electrode elements 22 and 24, including any tab structures extending therefrom are typically comprised of a material that easily conducts electricity from the electrode elements 22 and 24 to the terminations 32 and 34 while providing ease of manufacture, ease and reliability of material adhesion and good thermal shock characteristics. One such material often used to form the electrode elements and tab structures 38 is nickel.

In accordance with the exemplary embodiment of FIG. 6B, portions 37 of electrode elements 24 that extend to the periphery of the device may be formed as resistive alloys such as nickel diffused with chrome. This configuration could be effected by coating a diffusible material, such as chrome, phosphorus, or nitrides onto the outside of capacitor 20i before termination. Alternative material selections for resistive alloy portions 37 might include Ni/P or Pd/Ag alloys, as well as, various nitrides. The part is then preferably subjected to high temperatures in a non-oxidizing atmosphere, and the diffused alloy portions 37 are formed. This process is advantageous in that it can be done after initial firing of the layered stack of the capacitor body, thus subjecting the device 20i to temperatures at only a couple hundred of degrees Celsius as opposed to higher firing temperatures. A capacitor with such diffused resistive alloy portions 37 would provide the required conductivity for the device while increasing the resistance of the tabs or portions of electrode elements 22 and 24 that extend to the periphery of the device, thus allowing a determined value of the ESR of the overall device 20i.

Figure 7A:
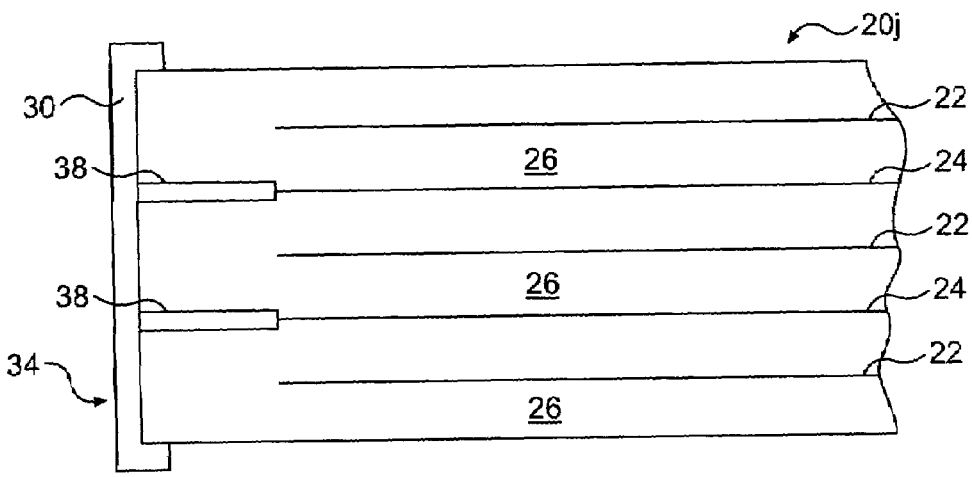
FIG. 7A is a partial cross-sectional view of a sixth alternative exemplary multilayer capacitor in accordance with the present subject matter.

As previously mentioned, many capacitor devices include internal electrode elements completely contained within the device body provided with tab structures for electrically connecting the electrode elements to peripheral terminations. In accordance with a sixth alternative embodiment of the present technology, FIG. 7A illustrates a modification to tab structures 38, which connect electrode elements 24 to peripheral termination 34, while adding controlled ESR to the capacitor device 20j. A similar tab modification can be employed with electrode elements 22 and termination 32 (not shown). In accordance with such capacitor embodiment 20j, electrode elements 22 and 24 as well as terminations 34 and 32 correspond to a selected conductive material. Electrode tab portions 38, however, are printed with a resistive material such that electrical connection between electrode elements and their corresponding termination is effected while also providing an additional controlled ESR value to the device 20j.

Figure 7B:
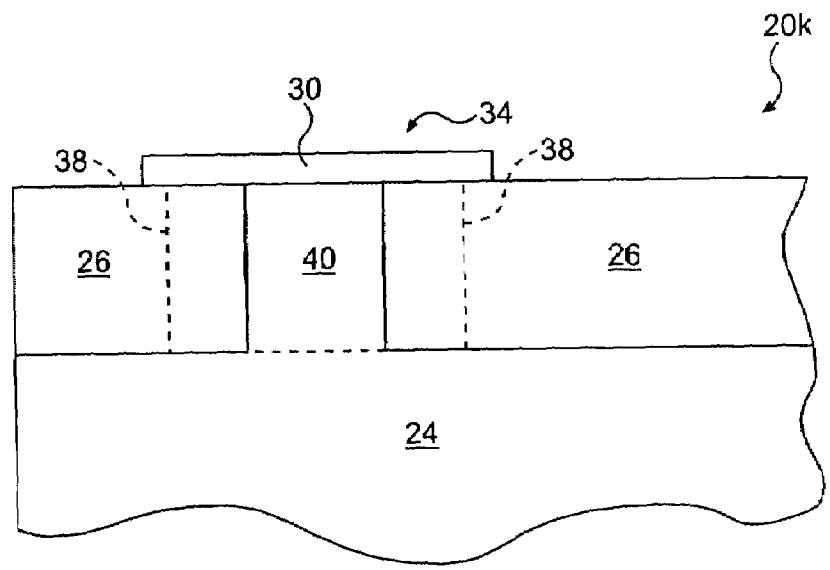
FIG. 7B is a partial cross-sectional view of a seventh alternative exemplary multilayer capacitor in accordance with the present subject matter.

Alternatively, a structural alteration to the tab structures 38 may be made to achieve similar results in accordance with the disclosed technology. As shown in FIG. 7B, the tab structure 38 connecting a second electrode element 24 to its termination 34, may be narrowed thus restricting the flow path for the electrical energy and raising the tab structure's resistance. Such an increase in resistance within the device 20k is directly responsible for an increase in the device's 20k overall ESR. In such a manner, the careful manipulation of the width of tab structure 38 to a more narrow profile 40 allows for a manufacturer controlled ESR value for the device 20k.

Figure 8A:
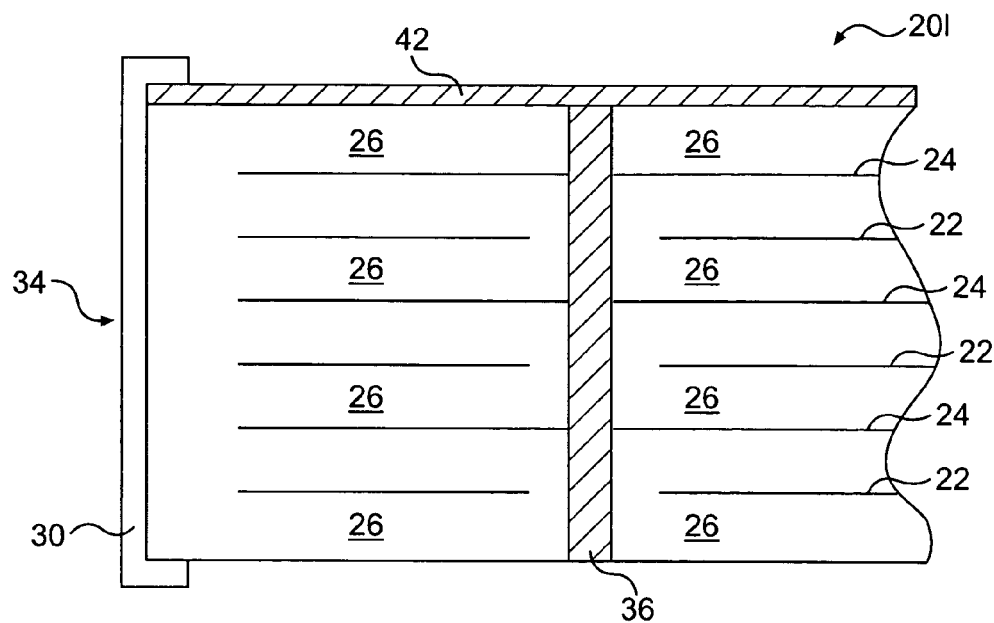
FIG. 8A is a partial cross-sectional view of an eighth alternative exemplary multilayer capacitor in accordance with the present subject matter.
Figure 8B:
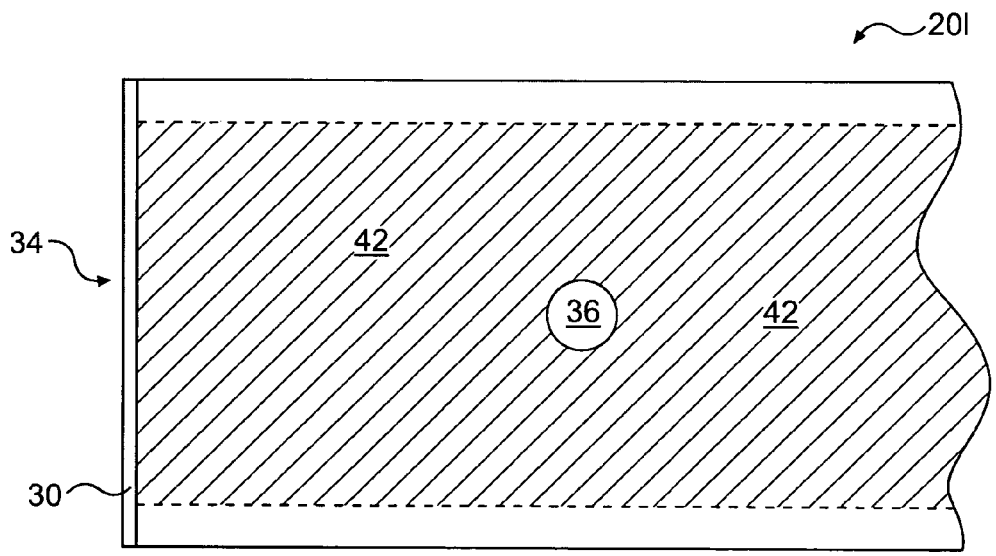
FIG. 8B is a partial overhead perspective view of an alternative exemplary tab structure as shown in FIG. 8A.

In an eighth alternative exemplary embodiment of the present subject matter, as illustrated in FIGS. 8A and 8B, a capacitor body 20l comprises a plurality of first conductive layers, each forming at least one first electrode element 22. Each of such first electrode elements 22 is provided in electrical connection to a first termination 36. In addition, a dielectric layer 26 is disposed on each of such plurality of first conductive layers. Further, a plurality of second conductive layers, each forming at least one second electrode element 24, is disposed on each of the dielectric layers 26 and is electrically connected to a second opposing polarity termination.

The completed capacitor body 20l comprises a plurality of first electrode elements 22 and a plurality of second electrode elements 24 interleaved to form a stack wherein each of the first electrode elements 22 opposes one of the at least one second electrode elements 24. The first termination is comprised of a via filled entirely or partially with termination material 36 such that an electrical connection is provided with the plurality of first electrode elements 22. Termination material 36 filling the via of FIG. 8A may comprise either a conductive or resistive material. Termination material 36 is electrically connected to a side termination 34 by way of a resistive or conductive layer 42 on an outer surface of the capacitor body 20l. If via termination material 36 is conductive, then layer 42 is preferably resistive; if via termination material 36 is resistive, then layer 42 is preferably conductive. The resistive or conductive layer 42 of FIG. 8A is depicted in an alternative view in FIG. 8B, which displays the adjacent configuration of termination material 36 in the through via with layer 42.

Figure 9A:
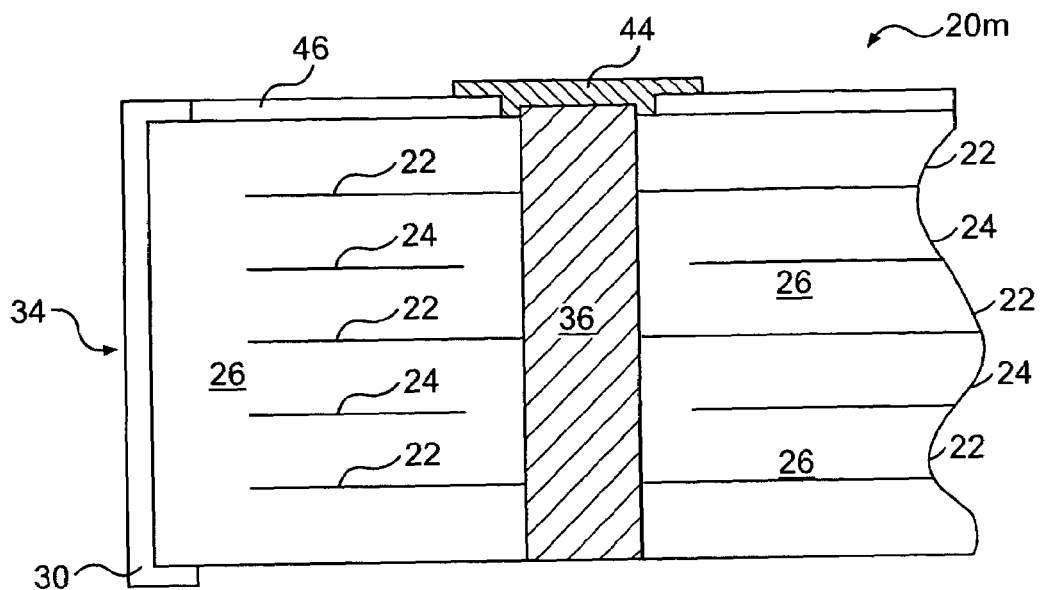
FIG. 9A is a partial cross-sectional view of a ninth alternative exemplary multilayer capacitor in accordance with the present subject matter.
Figure 9B:
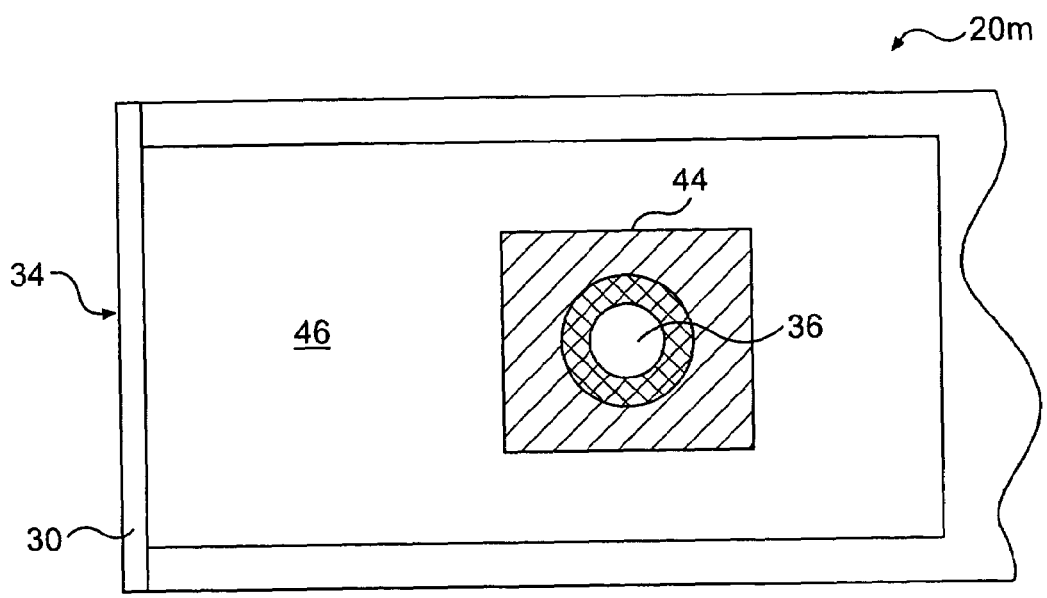
FIG. 9B is a partial overhead perspective view of the exemplary capacitor shown in FIG. 9A.

FIGS. 9A and 9B show yet another alternative for providing controlled resistance in accordance with the present technology. Similar to FIGS. 8A and 8B, a through via is provided in capacitor device 20m and filled with termination material 36 to connect to electrode elements 22. A similar filled-via configuration may be provided to connect with opposing electrode elements 24. A conductive or resistive via cap 44 in communication with a conductive layer 46 on an outer surface of the capacitor body 20m may provide connection to peripheral termination 34 and similarly to an opposing peripheral termination (not shown). Termination material 36 may either entirely or partially fill the via with a resistive material or may utilize a radial resistive print to coat only the interior surface of the via with such material. Termination material 36 may also comprise a conductive material as opposed to a more generally resistive material in certain embodiments of the present subject matter. FIG. 9B displays an alternative view of the capacitor configuration 20m of FIG. 9A.

Figure 10:
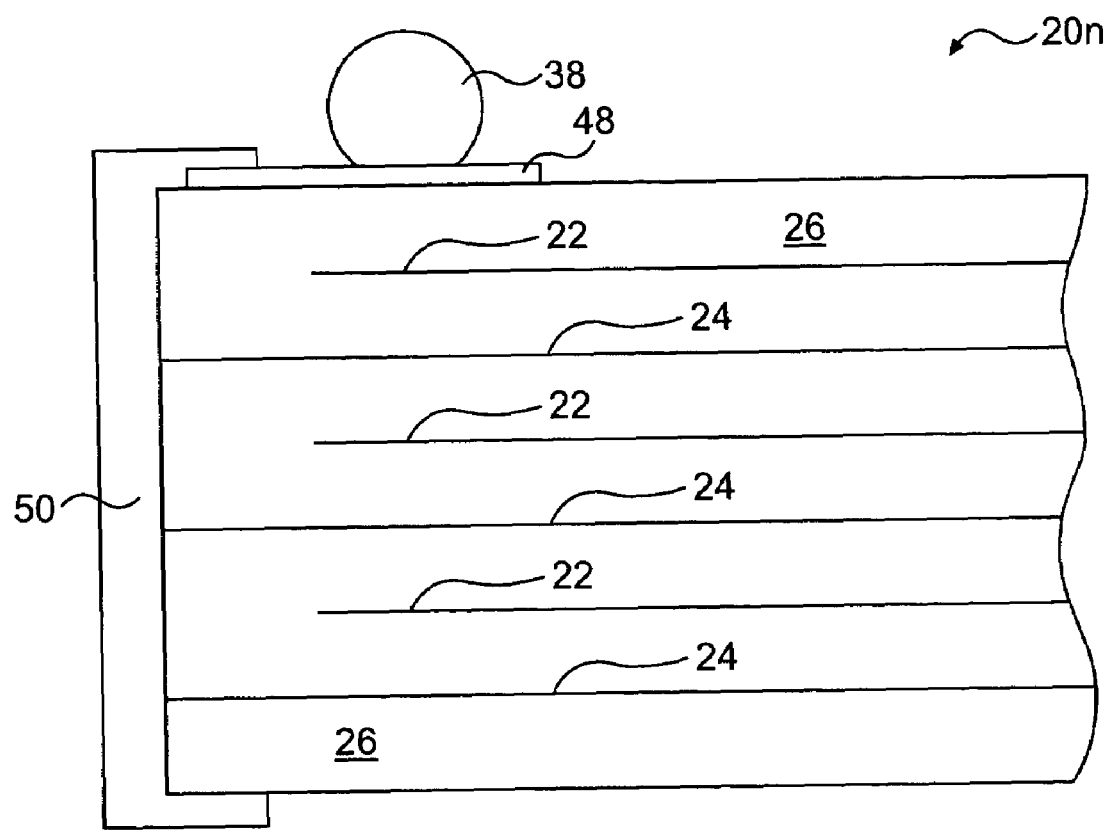
FIG. 10 is a partial cross-sectional view of a tenth alternative exemplary multilayer capacitor in accordance with the present subject matter.

A still further exemplary capacitor embodiment in accordance with the disclosed technology is depicted in FIG. 10, which displays a capacitor device 20n with first and second internal conductive layers, each respectively comprising at least one electrode element. The first and second internal conductive layers are interleaved with dielectric layers 26 in a stack such that selected first and second electrode elements 22 and 24 oppose each other. A conductive pad 48 or other termination connection is preferably provided on a selected top or bottom layer of the device. A controlled thick-film resistor or plated resistive layer 50 is then preferably provided along the ends of the device where internal electrode elements 22 and 24 are exposed. The resistive elements 50 wrap around to the surfaces where conductive pads 48 are provided such that an electrical connection is formed between the internal electrode elements 22 and 24 and the external conductive termination portions 48. The affixation of solder balls 38 to conductive pads 48 is an additional option for facilitating certain component mounting preferences.

Although several preferred embodiments of the disclosed technology have been described using specific terms and devices, such descriptions are for illustrative purposes only. The words used are words of description rather than of limitation. It is to be understood that changes and variations may be made by those of ordinary skill in the art without departing from the spirit or the scope of the present subject matter, which is set forth in the following claims. In addition, it should be understood that aspects of various other embodiments may be interchanged both in whole or in part. Therefore, the spirit and scope present subject matter should not be limited to the description of the preferred version contained herein.

What is claimed is:

1. A multilayer capacitor with low inductance and controlled resistance properties, comprising:
   a plurality of first conductive layers, wherein each said first conductive layer respectively forms at least one first electrode element;
   a plurality of second conductive layers, wherein each said second conductive layer respectively forms at least one second electrode element;
   a plurality of dielectric layers interleaved with the respective said pluralities of first and second conductive layers to form a multilayer capacitor body, wherein each of the at least one first electrode elements opposes one of the at least one second electrode elements;
   at least one first multi-layered termination comprising an inner resistive layer and an outer conductive layer, wherein said inner resistive layer of said at least one first multi-layered termination is adjacent to and electrically connected to each of said at least one first electrode elements; and
   at least one second multi-layered termination comprising an inner resistive layer and an outer conductive layer, wherein said inner resistive layer of said at one second multi-layered termination is adjacent to and electrically connected to each of said at least one second electrode elements;
   wherein the equivalent series resistance (ESR) of said multilayer capacitor is greater than about thirty milliohms;
   wherein said first and second electrode elements are respectively formed in a shape selected from the group consisting of a serpentine shape, a mesh shape, and a spiral shape; and
   wherein each of said inner resistive layers of said at least one first and second multi-layered terminations includes ruthenium.

2. A multilayer capacitor as in claim 1, wherein each of the inner resistive layers of said at least one first and second multi-layered terminations comprises a thick-film resistor that is either fired onto the multilayer capacitor body or affixed to the multilayer capacitor body by polymer adhesives.

3. A multilayer capacitor as in claim 1, wherein each of the inner resistive layers of said at least one first and second multi-layered terminations comprises a thin film resistive layer that is either plated on or sputtered on.

4. A multilayer capacitor as in claim 1, wherein the outer conductive layers of said at least one first and second multi-layer terminations comprises a material selected from the group consisting of nickel (Ni), nickel-chromium alloy (Ni/Cr), silver (Ag), palladium (Pd), tin (Sn), and lead-tin alloy (Pb/Sn).

5. A multilayer capacitor as in claim 1, wherein said at least one first and second multilayer terminations respectively comprise an intermediate solder barrier layer between the inner resistive and outer conductive layers.

6. A multilayer capacitor as in claim 1, wherein selected of the respective first and second electrode elements comprise a resistive material.

7. A multilayer capacitor with low inductance and controlled resistance properties, comprising:
   a plurality of first conductive layers, wherein each said first conductive layer respectively forms at least one first electrode element;
   a plurality of second conductive layers, wherein each said second conductive layer respectively forms at least one second electrode element;
   a plurality of dielectric layers interleaved with the respective said pluralities of first and second conductive layers to form a multilayer capacitor body, wherein each of the at least one first electrode elements opposes one of the at least one second electrode elements;
   at least one first multi-layered termination comprising an inner resistive layer and an outer conductive layer, wherein said at least one first multi-layered termination is electrically connected to each of said at least one first electrode elements; and
   at least one second multi-layered termination comprising an inner resistive layer and an outer conductive layer, wherein said at one second multi-layered termination is electrically connected to each of said at least one second electrode elements;
   wherein the equivalent series resistance (ESR) of said multilayer capacitor is greater than about thirty milliohms; and
   wherein each of said inner resistive layers of said at least one first and second multi-layered terminations comprises a mixture of ruthenium oxide and glass frit.

8. A multilayer capacitor as in claim 7, wherein said at least one first and second multilayer terminations respectively comprise at least one portion of metal flash that is plated on exposed portions of said at least one first and second electrode elements, on top of which said inner resistive layers are provided.

9. A multilayer capacitor as in claim 8, wherein the at least one portion of metal flash in said at least one first multilayer termination is electrically connected to each of said at least one first electrode elements, and wherein the at least one portion of metal flash in said at least one second multilayer termination is electrically connected to each of said at least one second electrode elements.

10. A multilayer capacitor with low inductance and controlled resistance properties, comprising:
   a plurality of first conductive layers, wherein each said first conductive layer respectively forms at least one first electrode element;
   a plurality of second conductive layers, wherein each said second conductive layer respectively forms at least one second electrode element;
   a plurality of dielectric layers interleaved with the respective said pluralities of first and second conductive layers to form a multilayer capacitor body, wherein each of the at least one first electrode elements opposes one of the at least one second electrode elements;
   at least one first multi-layered termination comprising an inner resistive layer and an outer conductive layer, wherein said at least one first multi-layered termination is electrically connected to each of said at least one first electrode elements; and at least one second multi-layered termination comprising an inner resistive layer and an outer conductive layer, wherein said at one second multi-layered termination is electrically connected to each of said at least one second electrode elements;

wherein the equivalent series resistance (ESR) of said multilayer capacitor is greater than about thirty milliohms; and wherein selected of said plurality of dielectric layers comprise a lossy dielectric material.

11. A multilayer capacitor, comprising:
a plurality of first conductive layers, wherein each said first conductive layer respectively forms at least one first electrode element;
a plurality of second conductive layers, wherein each said second conductive layer respectively forms at least one second electrode element;
a plurality of dielectric layers interleaved with the respective said pluralities of first and second conductive layers to form a multilayer capacitor body, wherein each of the at least one first electrode elements opposes one of the at least one second electrode elements;
at least one first via formed through a portion of the multilayer capacitor body and filled with a termination material, wherein the termination material filling said at least one first via serves to electrically connect each of the first electrode elements;
at least one second via formed through a portion of the multilayer capacitor body and filled with a termination material, wherein the termination material filling said at least one second via serves to electrically connect each of the second electrode elements; and
solder balls applied to the termination material filling selected of said at least one first and second vias.

12. A multilayer capacitor as in claim 11, further comprising at least one second via formed through a portion of the multilayer capacitor body and filled with a termination material, wherein the termination material filling said at least one second via serves to electrically connect each of the second electrode elements.

13. A multilayer capacitor as in claim 11, wherein the termination material filling selected of said at least one first via and said at least one second via comprises a resistive material.

14. A multilayer capacitor as in claim 13, wherein said resistive material comprises ruthenium oxide.

15. A multilayer capacitor as in claim 11, said first and second electrode elements are respectively formed in a shape selected from the group consisting of a serpentine shape, a mesh shape, a spiral shape, an L-shape, an O-shape, and a U-shape.

16. A multilayer capacitor, comprising:
a plurality of first conductive layers, wherein each said first conductive layer respectively forms at least one first electrode element;
a plurality of second conductive layers, wherein each said second conductive layer respectively forms at least one second electrode element;
a plurality of dielectric layers interleaved with the respective said pluralities of first and second conductive layers to form a multilayer capacitor body, wherein each of the at least one first electrode elements opposes one of the at least one second electrode elements;

at least one first via formed through a portion of the multilayer capacitor body and filled with a termination material, wherein the termination material filling said at least one first via serves to electrically connect each of the first electrode elements;
at least one external termination layer applied to the periphery of the multilayer capacitor body; and
a connective layer provided along a selected exterior location of said multilayer capacitor body to connect the termination material filling said at least one via to the at least one external termination.

17. A multilayer capacitor as in claim 16, wherein the termination material filling said at least one via comprises a conductive material and wherein said connective layer comprises a resistive material.

18. A multilayer capacitor as in claim 16, wherein the termination material filling said at least one via comprises a resistive material and wherein said connective layer comprises a conductive material.

19. A multilayer capacitor as in claim 16, wherein said connective layer corresponds to a resistive via cap and wherein the termination material filling said at least one via comprises conductive material.

20. A multilayer capacitor, comprising:
a plurality of first conductive layers, wherein each said first conductive layer respectively forms at least one first electrode element;
a plurality of second conductive layers, wherein each said second conductive layer respectively forms at least one second electrode element;
a plurality of dielectric layers interleaved with the respective said pluralities of first and second conductive layers to form a multilayer capacitor body, wherein each of the at least one first electrode elements opposes one of the at least one second electrode elements;
at least one first via formed through a portion of the multilayer capacitor body and filled with a termination material, wherein the termination material filling said at least one first via serves to electrically connect each of the first electrode elements; and
wherein the termination material coating the interior surface of said at least one via comprises a resistive material while the rest of the termination material filling said at least one via comprises a conductive material.

21. A multilayer capacitor as in claim 20, wherein selected of the respective first and second electrode elements comprise a resistive material such that the equivalent series resistance of the multilayer capacitor is greater than about thirty milliohms.

22. A multilayer capacitor as in claim 20, wherein said first and second electrode elements are respectively formed in a shape selected from the group consisting of a serpentine shape, a mesh shape, and a spiral shape.

23. A multilayer capacitor as in claim 20, wherein selected of said plurality of dielectric layers comprise a lossy dielectric material.

24. A multilayer capacitor, comprising:
a plurality of first conductive layers, wherein each said first conductive layer respectively forms at least one first electrode element;
a plurality of second conductive layers, wherein each said second conductive layer respectively forms at least one second electrode element;
a plurality of dielectric layers interleaved with the respective said pluralities of first and second conductive layers to form a multilayer capacitor body, wherein each of the at least one first electrode elements opposes one of the at least one second electrode elements;

first and second conductive pads provided along a selected surface of said multilayer capacitor body;

a first layer of resistive material applied to the periphery of the multilayer capacitor body and electrically connected to each of said first electrode elements as well as said first conductive pad; and a second layer of resistive material applied to the periphery of the multilayer capacitor body and electrically connected to each of said second electrode elements as well as said second conductive pad.

25. A multilayer capacitor as in claim 24, further comprising solder balls attached to said first and second conductive pads.

26. A multilayer capacitor as in claim 24, wherein selected of said first and second electrode elements comprise a resistive material.

27. A multilayer capacitor as in claim 24, wherein said first and second electrode elements are respectively formed in a shape selected from the group consisting of a serpentine shape, a mesh shape, and a spiral shape.

28. A multilayer capacitor as in claim 24, wherein selected of said plurality of dielectric layers comprise a lossy dielectric material.

29. A multilayer capacitor, comprising:

a plurality of first conductive layers, wherein each said first conductive layer respectively forms at least one first electrode element;

a plurality of second conductive layers, wherein each said second conductive layer respectively forms at least one second electrode element;

a plurality of dielectric layers interleaved with the respective said pluralities of first and second conductive layers to form a multilayer capacitor body, wherein each of the at least one first electrode elements opposes one of the at least one second electrode elements; and a plurality of electrode tab portions extending from selected of said at least one first electrode elements and said at least one second electrode elements and exposed on respective selected sides of the multilayer capacitor body, wherein selected of said plurality of electrode tab portions are printed with a resistive material.

30. A multilayer capacitor as in claim 29, wherein said resistive material comprises ruthenium oxide.

31. A multilayer capacitor as in claim 29, further comprising first and second respective terminations, wherein selected of said plurality of electrode tab portions connect each at least one first electrode elements to said first termination, and wherein selected of said plurality of electrode tab portions connect each at least one second electrode elements to said second termination.

32. A multilayer capacitor as in claim 29, further comprising at least one respective first and second via formed through a portion of said multilayer capacitor body and filled with a termination material, wherein the termination material filling said at least one first via electrically connects each of the first electrode elements and wherein the termination material filling said at least one second via electrically connects each of the second electrode elements.

33. A multilayer capacitor as in claim 32, wherein the termination material filling said at least one respective first and second vias comprises a resistive material.

34. A multilayer capacitor as in claim 29, wherein selected of the at least one respective first and second electrode elements comprise a resistive material.

35. A multilayer capacitor as in claim 29, wherein selected of said plurality of dielectric layers comprise a lossy dielectric material.

36. A multilayer capacitor as in claim 29, wherein said plurality of electrode tab portions are respectively formed with a predetermined surface area such that the effective resistance of such electrode tab portions exceeds a predefined amount.

37. A multilayer capacitor comprising:

a plurality of first conductive layers, wherein each said first conductive layer respectively forms at least one first electrode element;

a plurality of second conductive layers, wherein each said second conductive layer respectively forms at least one second electrode element;

a plurality of dielectric layers interleaved with the respective said pluralities of first and second conductive layers to form a multilayer capacitor body, wherein each of the at least one first electrode elements opposes one of the at least one second electrode elements;

a plurality of electrode tab portions extending from selected of said at least one first electrode elements and said at least one second electrode elements and exposed on respective selected sides of the multilayer capacitor body; and a conductivity-altering material diffused into selected of said plurality of electrode tab portions and the respective first and second electrode elements from which the electrode tab portions extend.

38. A multilayer capacitor as in claim 37, wherein said conductivity-altering material comprises chrome.

39. A multilayer capacitor as in claim 37, further comprising first and second respective terminations, wherein selected of said plurality of electrode tab portions connect each at least one first electrode elements to said first termination, and wherein selected of said plurality of electrode tab portions connect each at least one second electrode elements to said second termination.

40. A multilayer capacitor as in claim 37, further comprising at least one respective first and second via formed through a portion of said multilayer capacitor body and filled with a termination material, wherein the termination material filling said at least one first via electrically connects each of the first electrode elements and wherein the termination material filling said at least one second via electrically connects each of the second electrode elements.

41. A multilayer capacitor as in claim 40, wherein the termination material filling said at least one respective first and second vias comprises a resistive material.

42. A multilayer capacitor as in claim 37, wherein selected of said at least one respective first and second electrode elements are formed in a shape selected from the group consisting of a serpentine shape, a mesh shape, and a spiral shape.

43. A multilayer capacitor as in claim 37, wherein selected of the at least one respective first and second electrode elements comprise a resistive material.

44. A multilayer capacitor as in claim 37, wherein selected of said plurality of dielectric layers comprise a lossy dielectric material.

45. A multilayer capacitor as in claim 37, wherein said plurality of electrode tab portions are respectively formed with a predetermined surface area such that the effective resistance of such electrode tab portions exceeds a predefined amount.

* * * * *

UNITED STATES PATENT AND TRADEMARK OFFICE
CERTIFICATE OF CORRECTION

| | | |
|---|---|---|
| PATENT NO. | : 7,054,136 B2 | Page 1 of 1 |
| APPLICATION NO. | : 10/446464 | |
| DATED | : May 30, 2006 | |
| INVENTOR(S) | : Ritter et al. | |

It is certified that error appears in the above-identified patent and that said Letters Patent is hereby corrected as shown below:

In Column 16, line 31, after the word "at" and before the word "one", please insert --least--.

Signed and Sealed this

Twelfth Day of September, 2006

JON W. DUDAS
*Director of the United States Patent and Trademark Office*